US009573446B2

(12) United States Patent
Scheuring et al.

(10) Patent No.: US 9,573,446 B2
(45) Date of Patent: Feb. 21, 2017

(54) SWING DOOR ACTUATION SYSTEM HAVING A POWER SWING DOOR ACTUATOR AND A CONTROL SYSTEM

(71) Applicant: Magna Closures Inc., Newmarket (CA)

(72) Inventors: Joseph Felix Scheuring, Richmond Hill (CA); Jube Leonard, Barrie (CA); Dan Cosmin, Richmond Hill (CA); Luciano Boin, Richmond Hill (CA)

(73) Assignee: MAGNA CLOSURES INC., Newmarket (CA)

( * ) Notice: Subject to any disclaimer, the term of this patent is extended or adjusted under 35 U.S.C. 154(b) by 0 days.

(21) Appl. No.: 14/930,735

(22) Filed: Nov. 3, 2015

(65) Prior Publication Data
US 2016/0052375 A1    Feb. 25, 2016

Related U.S. Application Data

(63) Continuation of application No. 14/234,812, filed as application No. PCT/CA2012/000723 on Jul. 27, 2012, now Pat. No. 9,174,517.
(Continued)

(51) Int. Cl.
*B60J 5/04*    (2006.01)
*E05F 15/622*    (2015.01)
(Continued)

(52) U.S. Cl.
CPC .............. *B60J 5/047* (2013.01); *E05F 15/614* (2015.01); *E05F 15/616* (2015.01);
(Continued)

(58) Field of Classification Search
CPC ........ E05F 15/622; E05F 15/63; E05F 15/611; E05Y 2900/546; E05Y 2201/434; E05Y 2201/216; B60J 5/047
See application file for complete search history.

(56) References Cited

U.S. PATENT DOCUMENTS 3,002,581 A * 10/1961 Deibel .................... E05F 15/47
                                                        137/627.5
3,398,484 A    8/1968 Katsumura et al.
(Continued)

FOREIGN PATENT DOCUMENTS

CN    101372200 A    2/2009
CN    201372664 Y    12/2009
(Continued)

*Primary Examiner* — Justin Rephann
(74) *Attorney, Agent, or Firm* — Dickinson Wright PLLC

(57) ABSTRACT

A swing door actuation system for moving a door about a pivot axis between open closed positions relative to a vehicle body. The system includes a power swing door actuator having a housing connectable to one of the swing door and the vehicle body, an extensible member that moves relative to the housing, and connects to the other of the swing door and the vehicle body, a motor connected to a gear train, and a normally engaged clutch. The motor is operatively connected to a clutch input end through the gear train. The output end is operatively connected to the extensible member. The clutch is disengageable to disconnect the motor from the extensible member. The clutch has a slip torque that is sufficiently high to prevent movement of the door when the door is exposed to less than a selected external torque and the motor is stopped.

24 Claims, 11 Drawing Sheets

Related U.S. Application Data

(60) Provisional application No. 61/512,124, filed on Jul. 27, 2011.

(51) Int. Cl.
*E05F 15/614* (2015.01)
*E05F 15/616* (2015.01)

(52) U.S. Cl.
CPC ......... *E05F 15/622* (2015.01); *E05Y 2800/11* (2013.01); *E05Y 2900/531* (2013.01); *Y10T 74/18568* (2015.01); *Y10T 74/18696* (2015.01)

(56) References Cited

U.S. PATENT DOCUMENTS

| | | | |
|---|---|---|---|
| 4,644,693 A | 2/1987 | Wang | |
| 4,679,451 A | 7/1987 | Nakamura | |
| 4,759,418 A | 7/1988 | Goldenfeld et al. | |
| 5,375,374 A | 12/1994 | Rohroff, Sr. | |
| 5,434,487 A * | 7/1995 | Long | E05F 15/75 318/280 |
| 5,468,042 A | 11/1995 | Heinrichs et al. | |
| 5,513,467 A | 5/1996 | Current et al. | |
| 5,910,692 A | 6/1999 | Saeda et al. | |
| 5,913,763 A | 6/1999 | Beran et al. | |
| 6,134,836 A * | 10/2000 | Kawanobe | E05F 15/646 340/12.22 |
| 6,634,140 B1 | 10/2003 | Sellman | |
| 6,891,479 B1 | 5/2005 | Eccleston | |
| 7,533,591 B2 | 5/2009 | Wang | |
| 7,761,209 B2 | 7/2010 | Morris et al. | |
| 7,900,530 B2 | 3/2011 | Bochen et al. | |
| 8,234,817 B2 | 8/2012 | Neundorf et al. | |
| 8,413,532 B2 | 4/2013 | Wu | |
| 2003/0145667 A1 * | 8/2003 | Donald | F16K 31/047 74/89.26 |
| 2004/0046418 A1 | 3/2004 | Chikata et al. | |
| 2005/0022453 A1 | 2/2005 | Bosio | |
| 2005/0160846 A1 | 7/2005 | Chiang | |
| 2006/0112643 A1 * | 6/2006 | Yokomori | E05F 15/646 49/360 |
| 2006/0181108 A1 * | 8/2006 | Cleland | E05F 15/63 296/146.4 |
| 2007/0062119 A1 | 3/2007 | Ritter | |
| 2007/0175099 A1 * | 8/2007 | Kachouh | E05F 15/622 49/340 |
| 2007/0194599 A1 * | 8/2007 | Paton | E05F 15/622 296/146.4 |
| 2007/0261310 A1 | 11/2007 | Porat et al. | |
| 2008/0060273 A1 | 3/2008 | Bochen et al. | |
| 2008/0210029 A1 | 9/2008 | Wang | |
| 2008/0216409 A1 | 9/2008 | Bochen et al. | |
| 2008/0250720 A1 | 10/2008 | Oxley et al. | |
| 2008/0276537 A1 * | 11/2008 | Hanna | E05F 15/622 49/343 |
| 2009/0051192 A1 | 2/2009 | Ewing et al. | |
| 2009/0199668 A1 | 8/2009 | Batosky et al. | |
| 2009/0200830 A1 | 8/2009 | Paton et al. | |
| 2009/0217596 A1 * | 9/2009 | Neundorf | E05B 81/20 49/506 |
| 2010/0162839 A1 * | 7/2010 | Reif | F16H 7/021 74/89.38 |
| 2010/0186528 A1 | 7/2010 | Hillen et al. | |
| 2010/0282009 A1 | 11/2010 | Knudsen et al. | |
| 2011/0227436 A1 * | 9/2011 | Ishida | F16D 27/06 310/78 |
| 2011/0302841 A1 | 12/2011 | Ye et al. | |
| 2012/0000304 A1 | 1/2012 | Hamminga et al. | |
| 2012/0245800 A1 | 9/2012 | Koberstaedt et al. | |
| 2013/0186220 A1 | 7/2013 | Kummer et al. | |
| 2014/0137477 A1 | 5/2014 | Ooe et al. | |
| 2014/0224045 A1 | 8/2014 | Kummer | |
| 2015/0059250 A1 * | 3/2015 | Miu | E05F 15/611 49/349 |

FOREIGN PATENT DOCUMENTS

| | | |
|---|---|---|
| FR | 2814771 A1 | 4/2002 |
| JP | 10266690 A | 10/1998 |

* cited by examiner

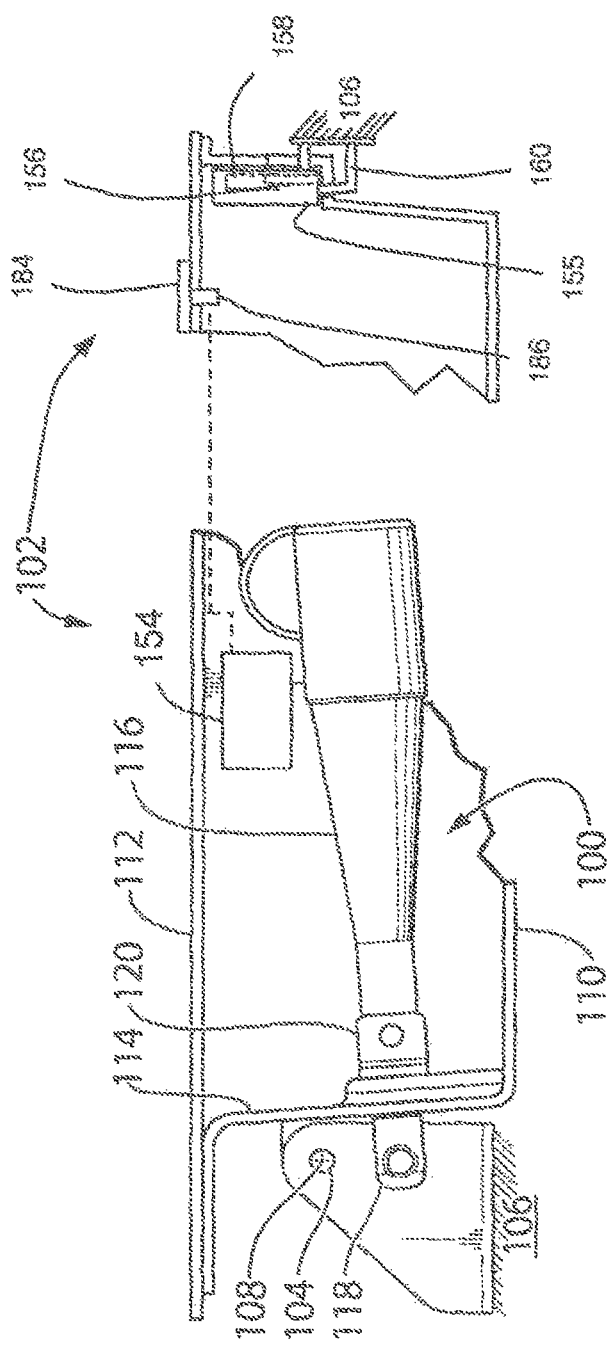

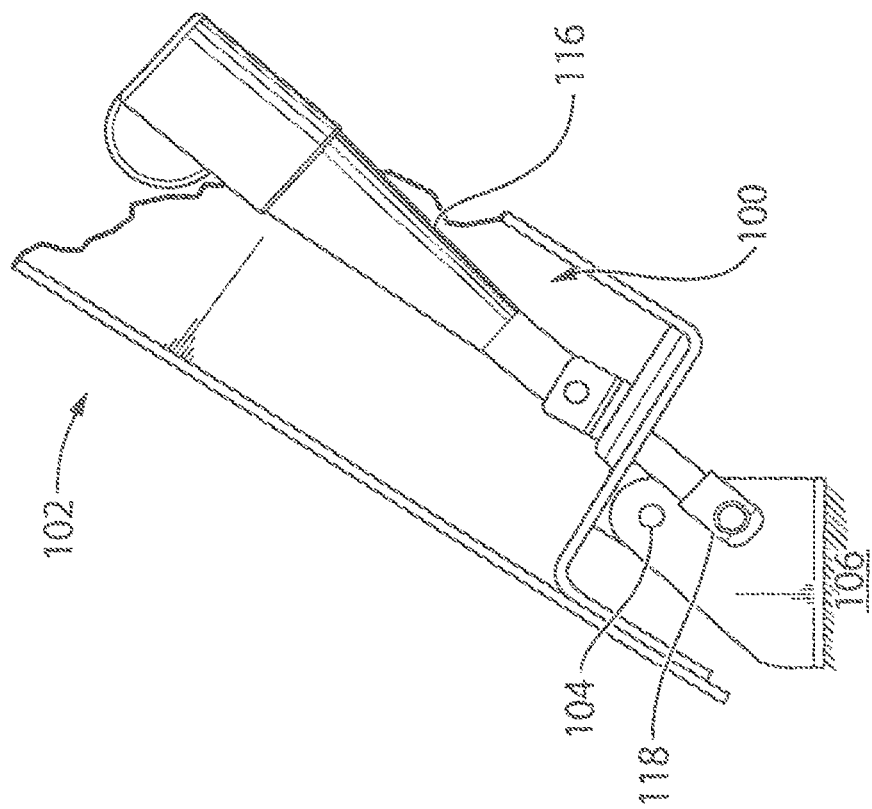

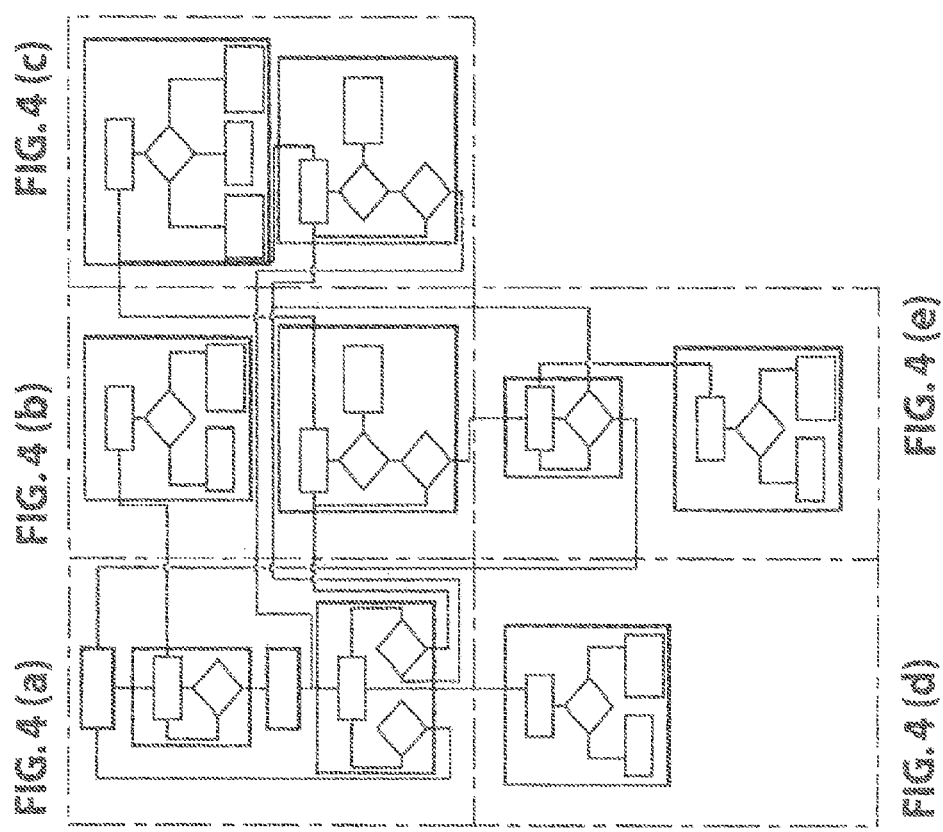

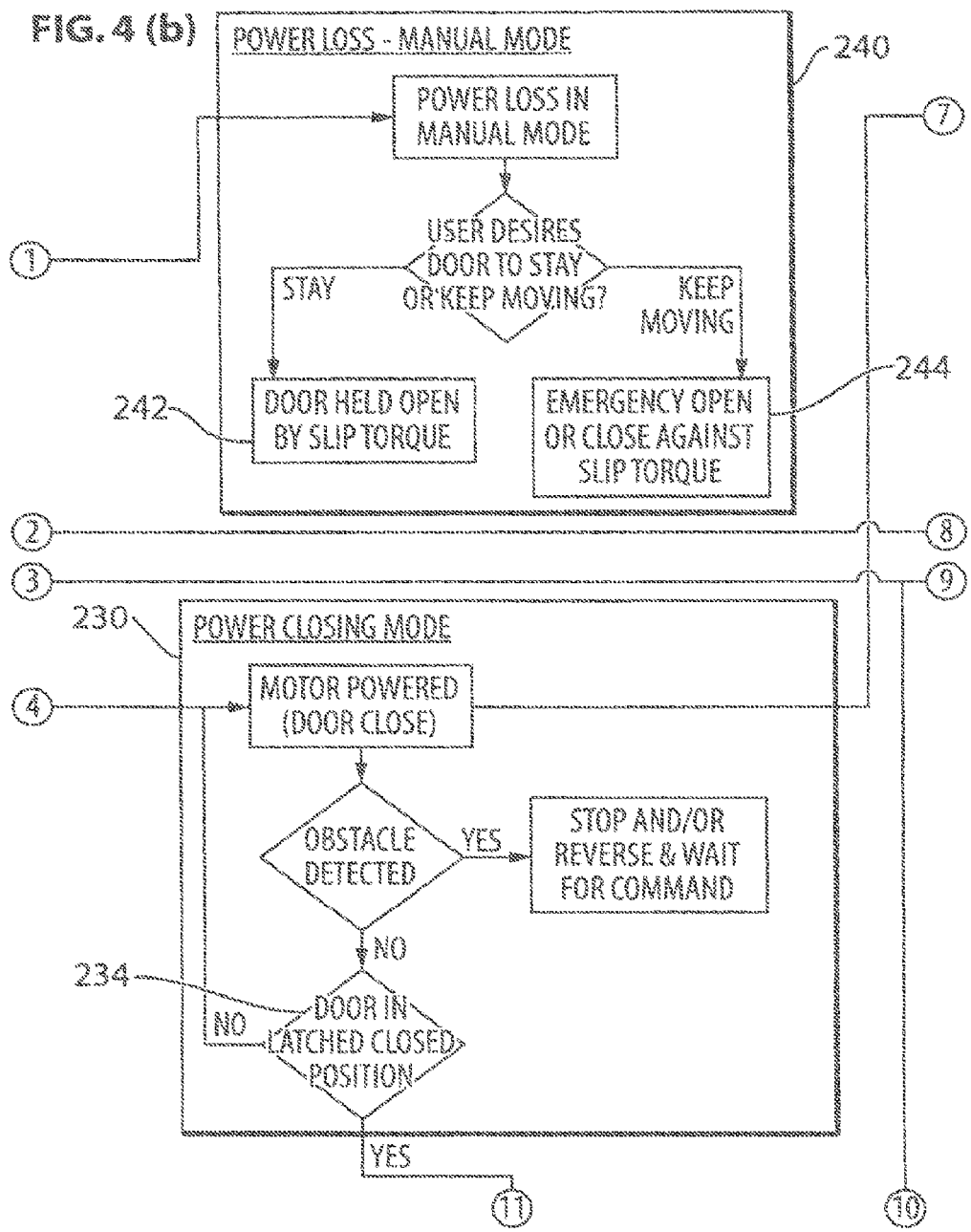

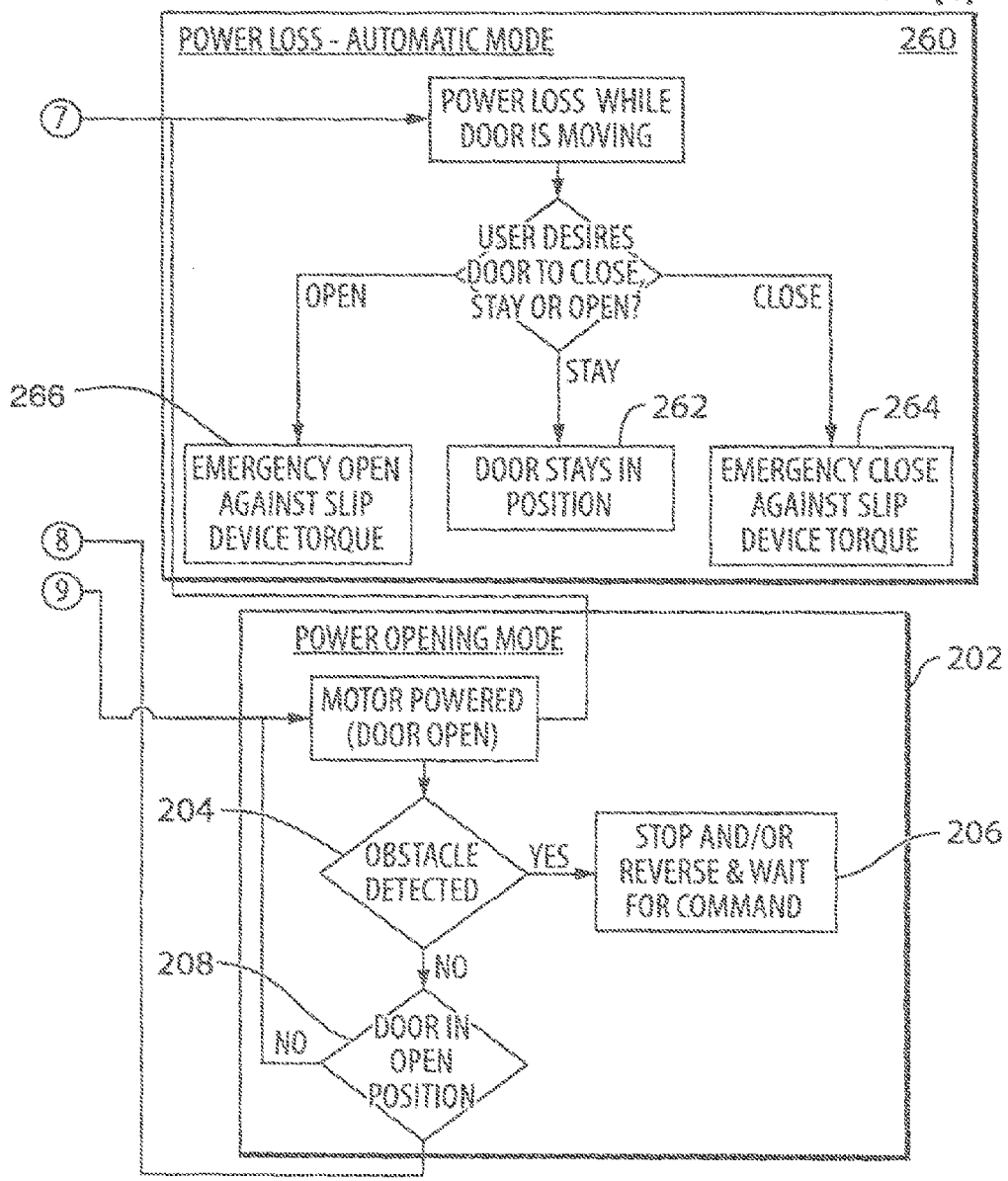

SWING DOOR ACTUATION SYSTEM HAVING A POWER SWING DOOR ACTUATOR AND A CONTROL SYSTEM

CROSS-REFERENCE TO RELATED APPLICATIONS

This application is a continuation of U.S. application Ser. No. 14/234,812 filed Jan. 24, 2014, now U.S. Pat. No. 9,174,517, which is a U.S. National Stage of International Application No. PCT/CA2012/000723 filed Jul. 27, 2012 and which claims the benefit of U.S. Provisional Patent Application No. 61/512,124 filed Jul. 27, 2011. The entire disclosures of each of the above applications is incorporated herein by reference.

FIELD

This disclosure relates to a system and method for opening and closing a vehicle door that pivots about a vertical axis.

BACKGROUND

Vehicle passenger doors are typically mounted to swing about a vertical axis. Lift gates are moveable panels that typically close a rear hatch opening in the vehicle. Lift gates are typically mounted to swing about a horizontal axis, and it is known to provide an electromechanical strut that can open and close the lift gate under power or alternatively enable the user to manually open and close the lift gate with no more effort than is typically necessary with conventional manual gas strut systems. It would be desirable to provide a power actuator for vehicle passenger doors that swing about a vertical axis ("swing doors") in order to provide the same level of functionality.

Lift gates can be quite heavy and typically require some sort of counterbalance mechanism to balance the weight of the door. Swing doors, however, have swing issues where, when the vehicle is on an incline, the swing door either opens too far or swings shut when open due to the unbalanced weight of the door. For this reason, passenger doors typically have some sort of detent or check provided in the door hinge to prevent unfettered swinging of the door. Such door hinges typically have detents in two or three positions which hold the door in one or two mid-travel door positions and a fully-open position. The user effort to enter and exit these detents is a compromise with the holding ability of the door.

Some vehicles, notably luxury vehicles, incorporate infinite door check products in the passenger doors which allow the door to be opened and held in check at any open position. The advantage of these systems is that they can stop the door in any position so that it is held from hitting other vehicles or structures next to the user vehicle. The infinite door check products on the market solve the hold-open issue but do not address the power open-close issues.

There are many vehicles that have a "power assist door close" or "soft close" feature which draws the door in (cinches) once it gets to an almost-closed position. Typically this feature is combined with an infinite door check feature. In addition, there are commercially available power-sliding doors for minivans or similar vehicles. However, it would be desirable to provide a fully-powered open and close capability for a swing door. It would also be useful to provide a power swing door actuator with an infinite door check function. In addition, it would be useful to provide a power swing door actuator with optional manual capability so as enable the user to manually open and close the swing door with substantially no more effort than is typically necessary with some conventional manual doors.

SUMMARY

In an aspect, a swing door actuation system is provided for moving a door about a vertical axis between open closed positions relative to a vehicle body. The system includes a housing connectable to one of the swing door and the vehicle body, an extensible member that extends and retracts relative to the housing, and is connectable to the other of the swing door and the vehicle body, a motor operatively connected to a gear train that is non-back drivable, and a clutch having input and output ends. The motor is operatively connected to the input end through the gear train. The output end is operatively connected to the extensible member. The clutch is normally engaged. The clutch is disengageable to disconnect the motor from the extensible member. The clutch has a slip torque that is sufficiently high to prevent movement of the door when the door is exposed to less than a selected external torque and when the motor is stopped.

The extensible member may include an internally threaded member or nut tube. A lead screw may be journalled in the housing for rotation in situ. The lead screw meshingly engages the internally threaded member so that rotary motion of the lead crew is converted into linear motion of the extensible member to move the internally threaded member between a retracted position corresponding to the closed position of the swing door and an extended position corresponding to the open position of the swing door.

A control system may be provided that powers the motor between the open and closed positions in response to a power open or power close signal. The control system also selectively disengages the clutch in response to a signal indicative of a user desire to manually move the swing door, whereby the lead screw can be back driven without driving the motor and locking gear train.

The locking gear train and the normally engaged clutch provide an infinite door check for maintaining the swing door open at any non-closed position. However, the clutch has a selected slip torque to enable a user to manually move the swing door in the event no electrical power can be applied to disengage the clutch and rotationally decouple the lead screw from the gear train.

BRIEF DESCRIPTION OF THE DRAWINGS

Reference is made, by way of example only, to the attached figures, wherein:

FIGS. 1a, 1b and 1c are schematic views of an example of a power swing door actuator in operation to move a vehicular swing door between a closed, mid-position, and open position, respectively;

FIGS. 4 and 4a-4e together are a system state diagram and logic flowchart followed by an electronic control system that interfaces with the actuator shown in FIGS. 1a, 1b and 1c.

DETAILED DESCRIPTION OF EXAMPLE EMBODIMENTS

Figure 1B:
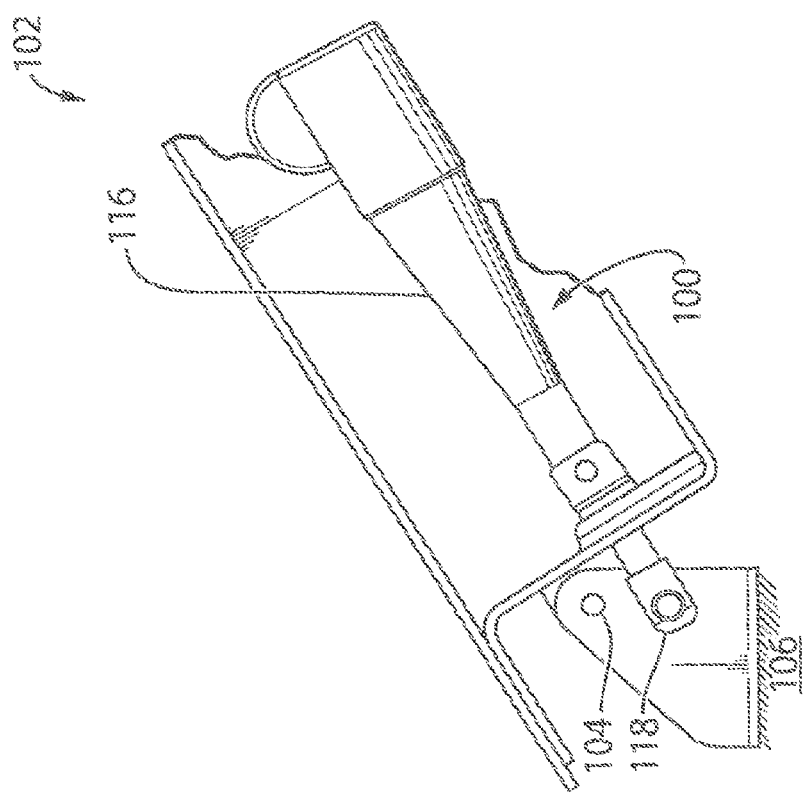

FIGS. 1a, 1b, and 1c show an embodiment of a power swing door actuator 100 in operation to move a vehicular swing door 102 between a closed, mid-position, and open position, respectively. The swing door 102 is pivotally mounted on at least one hinge 104 connected to the vehicle body 106 (not shown in its entirety) for rotation about a vertical axis 108. For greater clarity, the vehicle body 106 is intended to include the 'non-moving' structural elements of the vehicle such as the vehicle frame (not shown) and body panels (not shown).

The swing door 102 includes inner and outer sheet metal panels 110 and 112 with a connecting portion 114 between the inner and outer sheet metal panels 110 and 112. The actuator 100 has a housing 116 and an extensible member 118. The extensible member 118 is extendable from the housing 116 and can retract into the housing 116. The actuator 100 may be mounted between the inner and outer sheet metal panels 110, 112, where the actuator housing 116 is fixed to the swing door via a bracket 120 mounted to the connecting door portion 114. The extensible member 118 is mounted to the vehicle body 106.

Figure 2:
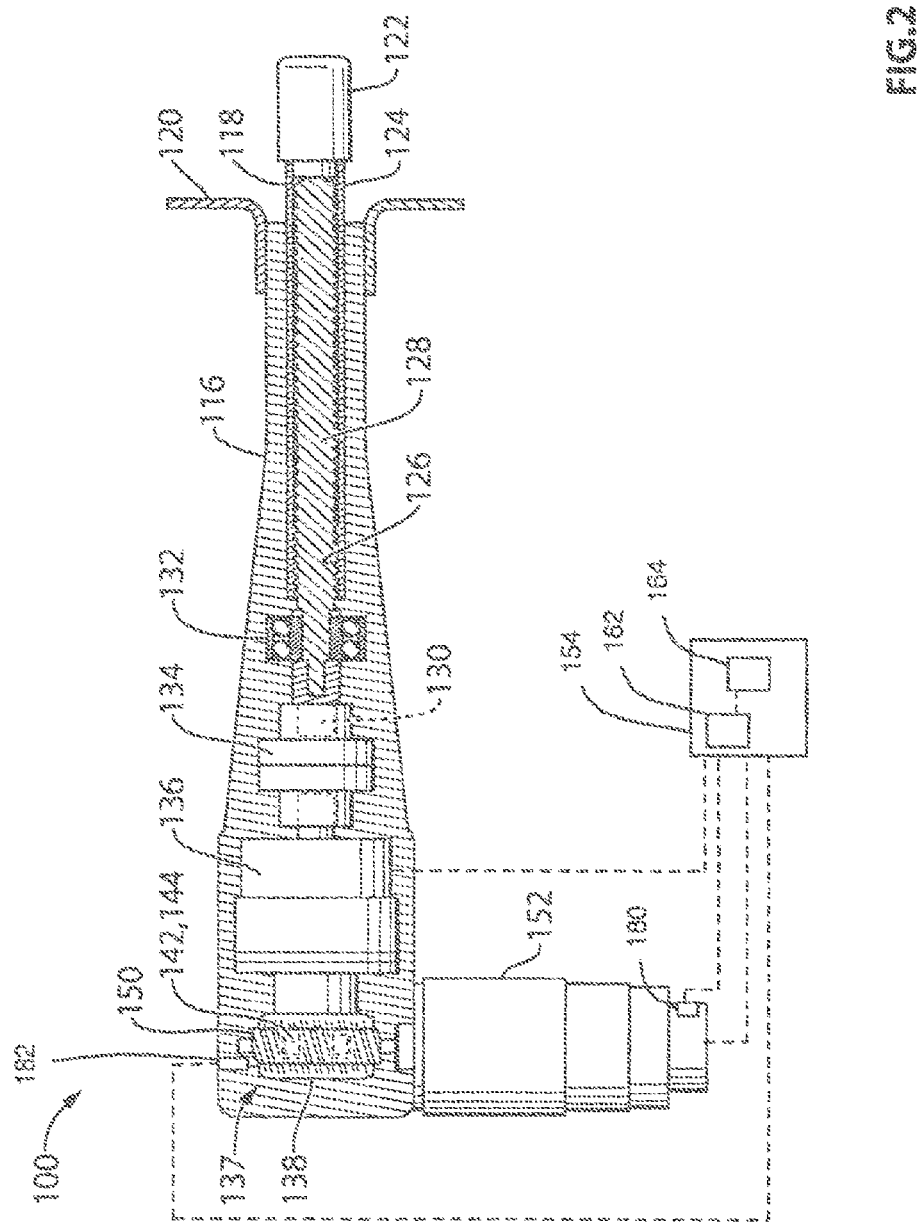
FIG. 2 is a cross-sectional view of the actuator shown in FIGS. 1a, 1b and 1c.

Referring additionally to the cross-sectional view of the actuator 100 in FIG. 2, the housing 116 defines a cylindrical chamber in which the extensible member 118 slides. The extensible member 118 has a ball socket 122 at an external end thereof for attachment to the vehicle body 106. The ball socket 122 is connected to a cylindrical tube 124 which has an internal thread 126 proximate an internal end of the extensible shaft 118.

The internally threaded member may be a cylindrical tube with an internal thread (and may be referred to as a nut tube) meshingly engages with a lead screw 128 mounted in the housing for rotation in situ. The lead screw 128 is matable with the internally threaded member 124 to permit relative rotation between lead screw 128 and the internally threaded member 124. In the embodiment shown, because the nut tube 124 is slidably connected in the housing 116 but is prevented from rotation, as the lead screw 128 rotates the nut tube 124 translates linearly, causing the extensible member 118 to move with respect to the housing 116. With the extensible member 118 connected to the vehicle body 106 and the housing 116 connected to the swing door 102, movement of the extensible housing causes the swing door 102 to pivot relative to the vehicle body 106.

The lead screw 128 is rigidly connected to a shaft 130 that is journalled in the housing 116 via ball bearing 132 that provides radial and linear support for the lead screw. In the illustrated embodiment an absolute position sensor 134 is mounted to the shaft 130. The absolute position sensor 134 as known in the art translates lead screw rotations into an absolute linear position signal so that the linear position of the extensible member 118 is known with certainty, even upon power up. In alternative embodiments the absolute linear position sensor 134 can be provided by a linear encoder mounted between the nut tube 124 and housing 116 which reads the travel between these components along a longitudinal axis.

The shaft 130 is connected to a clutch 136. The clutch 136 is normally engaged and is energized to disengage. In other words, the clutch 136 couples the lead screw 128 with a gear train 137 without the application of electrical power and the clutch 136 requires the application of electrical power to uncouple the lead screw 128 from the gear train 137. The clutch 136 may engage and disengage using any suitable type of clutching mechanism, such as a set of sprags, rollers, a wrap-spring, a pair of friction plates, or any other suitable mechanism.

Figure 3B:
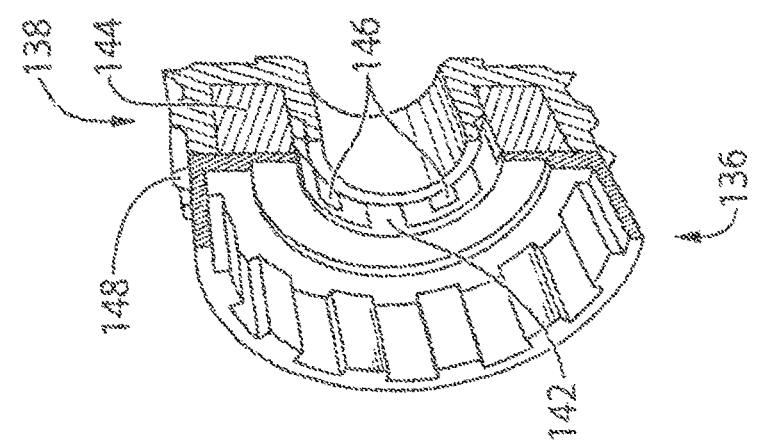
FIGS. 3a and 3b are exploded and assembly views, respectively, of a portion of a gear train employed by the actuator shown in FIGS. 1a, 1b and 1c.
Figure 3A:
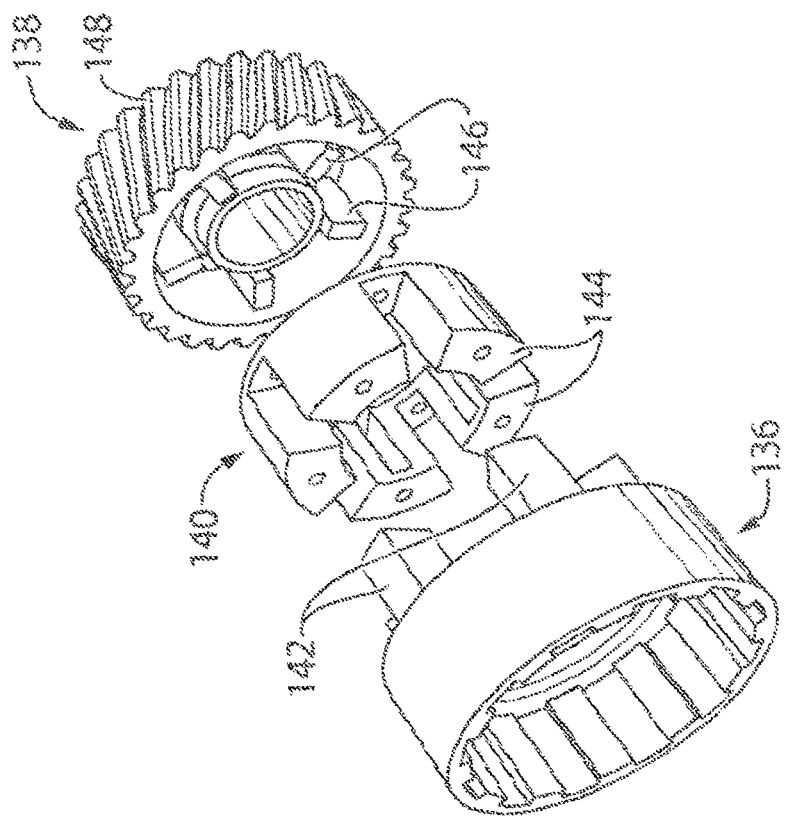
Figure 4:
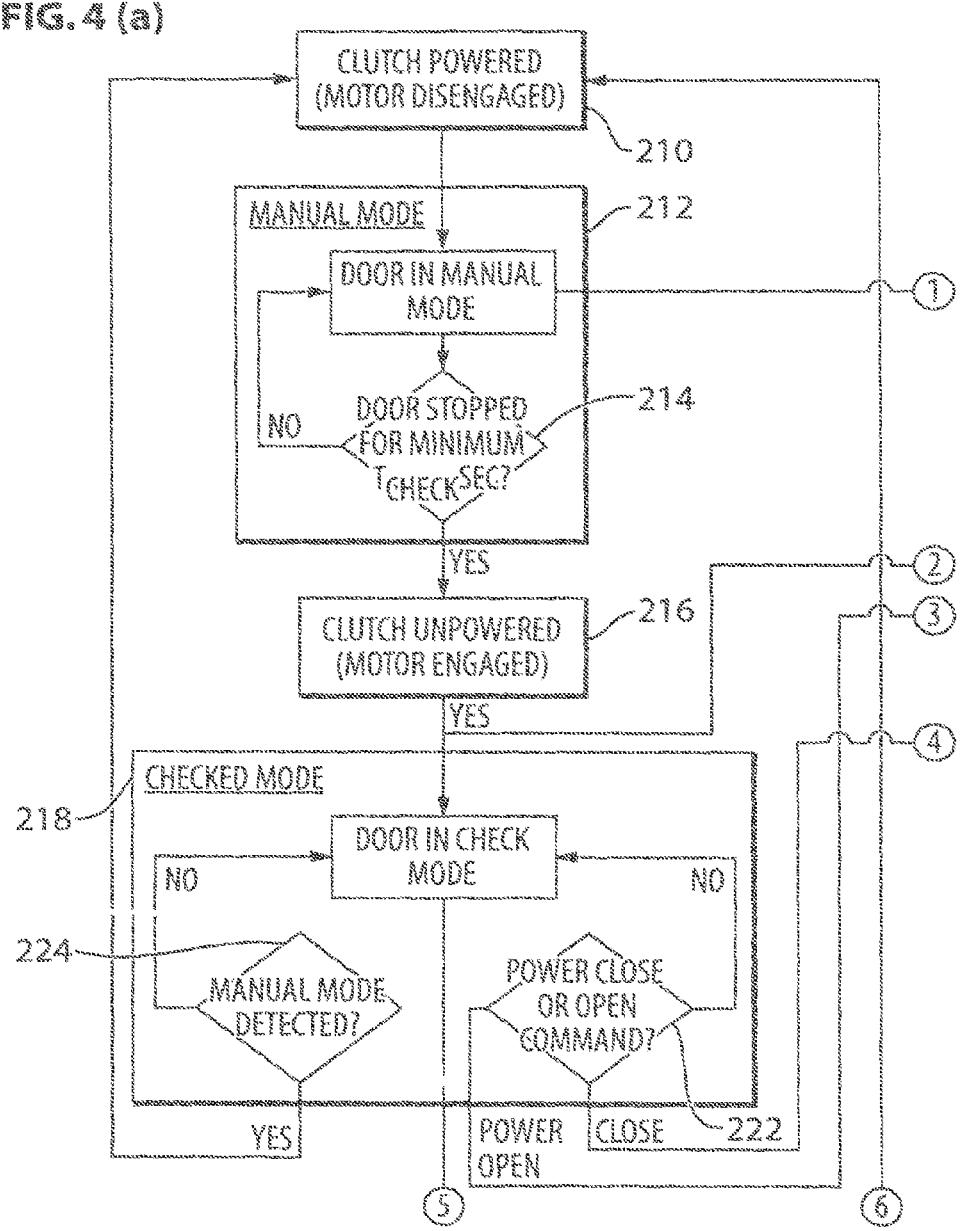
Figure 4:
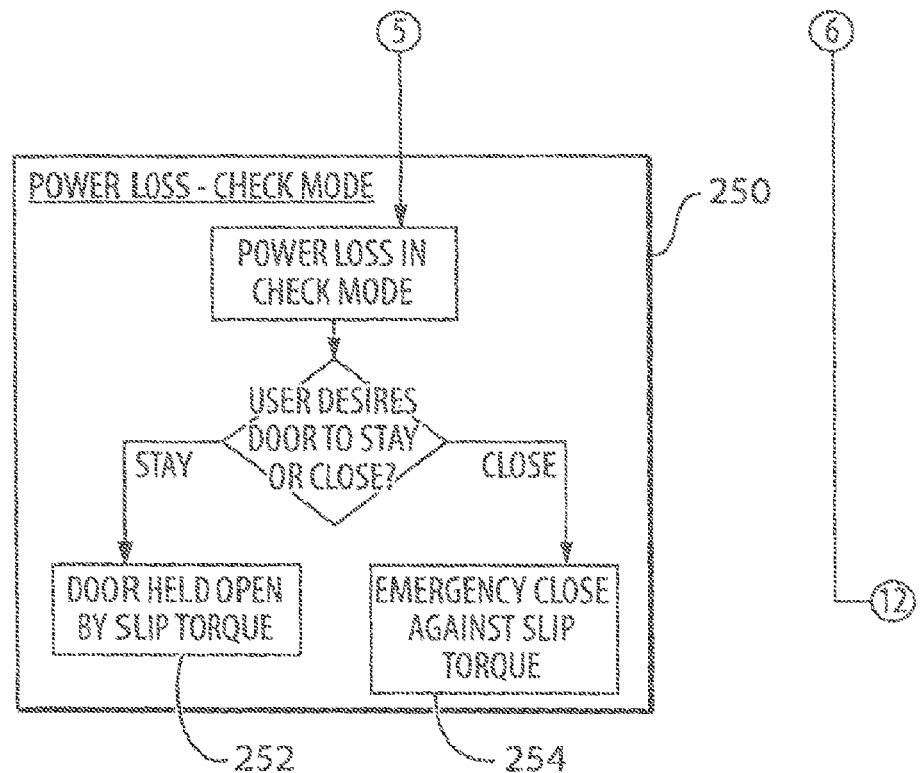
Figure 4:
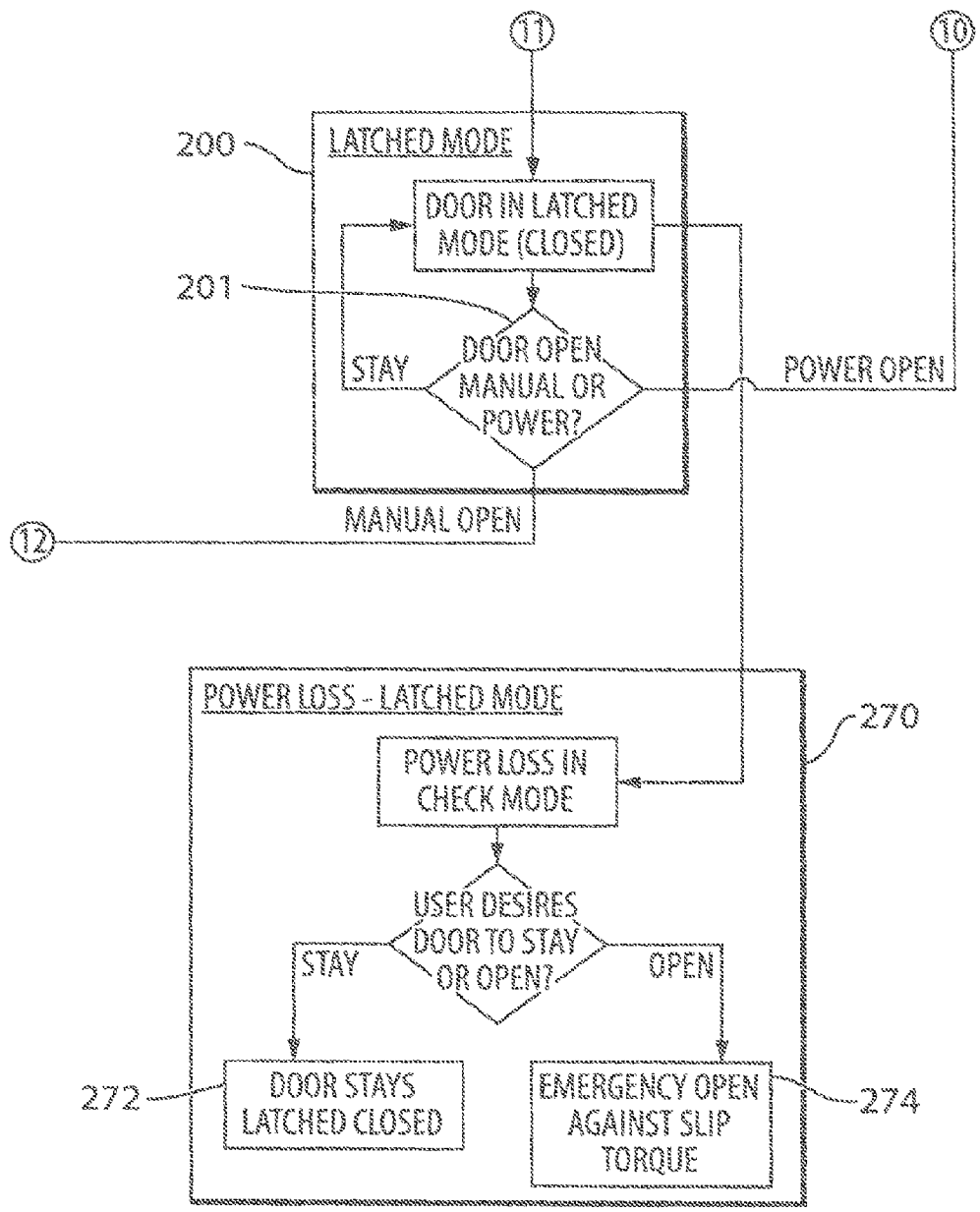

Referring additionally to FIGS. 3a and 3b, the clutch 136 is connected to a worm gear 138 via a flexible rubber coupling 140. As will be seen best in FIGS. 3a and 3b the clutch 136 features a series of lobes 142 that are interdigitated with nodules 144 of the flexible rubber coupling 140 and fins 146 of the worm gear 138. The flexible rubber coupling 140 helps to reduce gear noise by dampening vibrations and minimizing the effects of any misalignment between the clutch 136 and the gear train 137.

The worm gear 138 may be a helical gear having gear teeth 148. The worm gear 138 meshes with a worm 150 that is connected to the output shaft of an electric motor 152, which may, for example, be a fractional horsepower motor. The worm 150 may be a single start worm having a thread with a lead angle of less than about 4 degrees. The gear train 137 is thus provided by the worm 150 and worm gear 138 and provides a gear ratio that multiplies the torque of the motor as necessary to drive the lead screw and move the vehicle swing door. The motor 152 is operatively connected to the gear train 137 and is operatively connected to an input end 136a of the clutch 136 through the gear train 137. The output end (shown at 136b) of the clutch 136 is operatively connected to the extensible member 118 (in the embodiment shown, through the lead screw 128 and nut tube 124).

The worm 150 and worm gear 138 provide a locking gear train, which may also be referred to as a gear train that is non-back drivable. With the clutch 136 normally engaged, a relatively large amount of force is required to back-drive the gear train 137 and motor 152. Thus, the actuator 100 inherently provides an infinite door check function as the force required to back-drive the gear train 137 and motor 152 will be much larger than the force experienced by an unbalanced door as a result of the vehicle being situated on an incline.

However, the clutch 136 has an associated slip torque between the input end 136a and the output end 136b, that is a maximum amount of torque that the clutch 136 will transmit between the input and output ends 136a and 136b before slipping. Thus, when the clutch 136 is engaged, the clutch 136 will slip if a torque is applied at the input end 136a (or at the output end 136b) that exceeds the slip torque. The slip torque for the clutch 136 may be selected to be sufficiently low that, in the event of a power loss in the vehicle that would result in no electric power being available to disengage the clutch 136, the swing door 102 can still be manually moved by a person by overcoming the clutch slip torque. However, the slip torque may be selected to be sufficiently high so that it is sufficient to hold the swing door 102 in whatever position the door 102 is in, thereby providing the infinite door check function. In other words, the slip torque is sufficiently high that, if the swing door 102 is left in a particular position and the motor 152 is stopped, the slip torque will prevent movement of the door when the door is exposed to an external torque that is less than a selected value. An example of an external torque that would not overcome the slip torque would be applied by the weight of the swing door 102 when the vehicle is parked on a surface at less than a selected angle of incline. However, the slip torque is sufficiently low that the swing door 102 can be moved manually by a person (e.g. a person having a selected strength that would be representative of a selected percentage of the overall population in which the vehicle is to be sold). In normal operation the actuator 100 can be disengaged to allow for manual movement of the swing door 102 by applying power (i.e. energizing) to the clutch 136, in which case the motor 152 and gear train 137 will be decoupled from the lead screw 128. An example of a suitable slip torque that may be selected for the clutch 136 may be in the range of about 2 Nm to about 4 Nm. The slip torque that is selected for a particular application may depend on one or more of several factors. An example factor based on which the slip torque may be selected is the weight of the door 102. Another example factor based on which the slip torque may be selected is the geometry of the door 102. Yet another example factor based on which the slip torque may be selected is the amount of incline on which the vehicle is intended to be parked while still ensuring that the door 102 is holdable in any position.

In an alternative embodiment, the internally threaded member 124 and the lead screw 128 may be switched in position. That is, the internally threaded member 124 may be driven by the output end 136*b* of the clutch 136 and the lead screw 128 may be slidably connected to the housing 116. Thus, the output end 136*b* of the clutch 136 may be connected to either one of the lead screw 128 and the internally threaded member 124 and the other of the lead screw 128 and the internally threaded member 124 may be connected to the extensible member 118 and may thus be slidable relative to the housing 116. Rotation of the output end 136*a* of the clutch 136 drives rotation of whichever one of the lead screw 128 and the internally threaded member 124 the output end 136*a* is connected, which in turn drives sliding movement of the other of the lead screw 128 and the internally threaded member 124 relative to the housing 116.

A swing door actuation system is provided that includes the actuator 100 and a control system 154. The control system 154 may also be operatively connected to a door latch, shown at 155 in FIG. 1*a*, that is provided as part of the swing door 102. The door latch 155 may include a ratchet 156 and a pawl 158 both of which may be any suitable ratchet and pawl known in the art. The ratchet 156 is movable between a closed position (as shown in FIG. 1*a*) wherein the ratchet 156 holds a striker 160 that is mounted to the vehicle body 106 and an open position wherein the striker 160 is not held by the ratchet 156. When the ratchet 156 is in the closed position the door latch 155 may be said to be closed. When the ratchet 156 is in the open position the door latch 155 may be said to be open. The pawl 158 is movable between a ratchet locking position wherein the pawl 158 holds the ratchet 156 in the closed position and a ratchet release position wherein the pawl 158 permits movement of the ratchet 156 to the open position. Any other suitable components may be provided as part of the door latch 155, such as components for locking and unlocking the swing door 102, and motors for causing movement of the pawl 158 between the ratchet locking and ratchet release positions.

The control system 154 provides system logic for selectively powering the clutch 136 based on a number of signal inputs. The control system 154 may include a microprocessor 162 and a memory 164 that contains programming that is configured to carry out the method steps described below, and may be configured to receive inputs and transmit outputs as described below.

While the control system 154 has been shown in FIG. 2 as a single block, it will be understood by persons skilled in the art that in practice the control system 154 may be a complex distributed control system having multiple individual controllers connected to one another over a network.

The swing door 102 may have a conventional opening lever (not shown) located inside the passenger compartment for manually opening the door latch 155. This opening lever may trigger a switch connected to the control system 154 such that, when the switch is actuated, the control system 154 powers (i.e. energizes) the clutch 136 to disengage the actuator 100 and allow for manual movement of the swing door 102.

The control system 154 can operate in a 'power assist' mode where the control system 154 determines that a user is trying to manually move the swing door 102 when the actuator 100 is in a power open or power close mode. A current sensor 180 (FIG. 2) may be provided for the motor 152 for determining the amount of current drawn by the motor 152. One or more Hall-effect sensors (one is shown at 182) may be provided and positioned to send signals to the control system 154 that are indicative of rotational movement of the motor 152 and indicative of the rotational speed of the motor 152, e.g. based on counting signals from the Hall-effect sensor 182 detecting a target on the motor output shaft. In situations where the sensed motor speed is greater than a threshold speed and where the current sensor registers a significant change in the current draw, the control system 154 may determine that the user is manually moving the door 102 while the motor 152 is also moving the door 102, and that therefore the user wishes to manually move the swing door 102. The control system 154 may then stop the motor 152 and may energize and thus disengage the clutch 136. Conversely, when the control system 154 is in the power open or close mode and the Hall-effect sensors indicate that the motor speed is less than a threshold speed (e.g. zero) and a current spike is registered, the control system 154 may determine that an obstacle is in the way of the door 102, in which case the control system 154 may take any suitable action, such as stopping the motor 152. As an alternative, the control system 154 may detect that the user wants to initiate manual movement of the door 102 if signals from the absolute position sensor 134 indicate movement of the extensible member at a time when the motor 152 is not powered.

FIGS. 4 and 4*a*-4*e* show a system state diagram and control system logic used by the control system 154 in greater detail. To assist with the clarity of the drawings, items numbered 1 to 12 in circles in FIGS. 4*a*-4*e* show where program flow lines connect in adjacent portions of the state diagram. The control system 154 is operable in a plurality of modes, including a latched mode 200 shown in FIG. 4*e*. In the latched mode 200, the swing door 102 is in the closed position and the door latch 155 is closed. This can be determined as known in the art by coupling the ratchet 156 to a switch which signals to the control system 154 when the ratchet 156 is in an open position, a closed position or in a partially closed position. In latched mode 200 the control system 154 waits for a door open signal at step 201. The door open signal can come from sources such as a remote switch such as a key fob or a dashboard mounted push button control in the passenger compartment, which will signal that the vehicle user wishes to initiate a power opening of the swing door 102. The door open signal could come from manual activation of the door latch opening lever 184 (FIG. 1*a*) which may switch a switch 186 positioned to send signals to the control system 154. The switching of switch 186 may indicate to the control system 154 that the user wishes to initiate a manual opening of the swing door 102. In the case where the control system 154 determines that signals indicate that the user wants a power opening of the door 102, the control system 154 enters a power opening mode 202 (FIG. 4*c*) where the motor 152 is powered to open the swing door 102. When in the power opening mode 202, the control system 154 continuously tests for the detection of an obstacle at step 204 in the manner discussed above. In the event that an obstacle is detected then at step 206 the powered operation of the actuator 100 stops and/or reverses slightly and the control system 154 waits for a new command. Otherwise the powered opening of the swing door 102 continues until at step 208 the control system 154 determines based on signals from the absolute position sensor 134 that the swing door 102 is open to a desired position.

In the case where the control system 154 determines that signals indicate that the user wants a manual opening of the swing door 102, the control system 154 energizes the clutch 136 at step 210 (FIG. 4a) and enters a manual opening mode 212. In the manual opening mode 212 the control system 154 checks to determine at step 214 whether or not the swing door 102 has stopped for at least a selected period of time. If so, then at step 216 the control system 154 deenergizes the clutch 136, thereby coupling the motor 152 to the extensible member 118, and the control system 154 enters a checked mode as shown at 218. At this point the swing door 102 is checked, because of the force required to back-drive the motor 152. The control system 154 waits for further input from the user, either in the form of a power open or power close command at step 222 via the remote key fob or some other way, or by determining that the vehicle user desires to manually move the swing door 102 at step 224 as a result of changing Hall counts instigated by manual movement of the swing door 102. In the case of a power open command the control system 154 re-enters the power opening mode 202 (FIG. 4c). In the case of a power close command the control system 154 re-enters the power closing mode 230 (FIG. 4b), wherein the actuator 100 is powered to close the swing door 102 until the control system 154 determines, e.g. based on signals from the absolute position sensor 134, that the swing door 102 is in the closed and latched position at step 234. In the case where the control system 154 determines that the user desires to manually move the swing door 102, control is passed back to step 210 for manual movement of the swing door 102.

In the event of a power loss the control system 154 (which may be provided with sufficient battery back-up power to run logic and control functions) enters one of several power loss modes. When the control system 154 is in the manual mode 212 and power is lost, the control system 154 enters a manual mode power loss mode 240 (FIG. 4b). In mode 240, because of the lack of power, the clutch 136 is engaged. As a result, if the user wishes to stop further manual movement of the swing door 102, they can do so and the door 102 will remain held (i.e. checked) at its current position as shown at step 242. If the user wishes to continue to move the door 102 from its current position they can do so at step 244 by overcoming the clutch slip torque associated with the clutch 136.

When the control system 154 is in the checked mode 218 and power is lost, the control system 154 enters checked mode power loss mode 250 (FIG. 4d). In this mode, the loss of power means that the clutch 136 is engaged and as a result, the door 102 will remain checked at step 252. If the user wishes to move the door, they can manually move the swing door open or closed at step 254 by overcoming the clutch slip torque associated with the clutch 136.

When the control system 154 is in the power open mode 202 or the power close mode 230 and power is lost, the control system 154 enters a powered movement power loss mode 260 (FIG. 4c). The door 102 will stop at its current position and will be held there (i.e. checked) at step 262 by virtue of the clutch slip torque. If the user desires to open or close the door 102 from the current position, they can manually open or close the door 102 at steps 264 or 266, by overcoming the clutch slip torque.

When the control system 154 is in the latched mode 200 and power is lost, the control system 154 enters latched mode power loss state 270 (FIG. 4e), where the swing door 102 can continue to remain closed at step 272, or if the user wishes, the swing door can be manually opened at step 274 by overcoming the clutch slip torque.

The swing door actuation system described enables a powered open and powered close of a vehicular swing door 102, where the normally engaged clutch 136 enables the motor 152 and gear train 137 to drive a lead screw 128 in order to open and close the swing door 102. The swing door actuation system also enables the user to manually open and close vehicle swing door by powering the clutch 136 to disengage the gear train 137 and motor 152 in a manual mode wherein only the lead screw 128 is back-driven during manual movement with relatively low manual effort and noise. The disengagement of the clutch 136 eliminates the effort and noise that is associated with back-driving the gear train 137 and motor 152. As a result, the manual effort to move the swing door 102 may be similar in some embodiments, to a conventional non-powered vehicle door. When the clutch 136 is engaged, an infinite position door check function is provided, via engagement of the lead screw 128 to the gear train 137 (and in particular to the worm 150, which has a thread angle configured to prevent back-driving from the worm gear 138). As a result of the normally engaged clutch 136, the infinite door check function is available in the event of vehicle power loss thereby precluding an uncontrolled swinging of the door 102 during such a power loss event. However, the user can still manually move the swing door 102 open and closed in a power loss event by overcoming an appropriately selected slip torque of the clutch 136. Additionally, the clutch 136 protects the swing door actuation system from shock and abuse loading.

The swing door actuation system provides a means for speed control and obstacle detection. Speed control is attained by the control system 154 monitoring the Hall-effect signals and/or the absolute position sensor signal. Either signal could be eliminated depending on the desired control features and redundancy requirements. The absolute position sensor is however highly desired for providing the position of the door upon power up or in case of power loss.

The swing door actuation system also provides acceptable sound levels during power and manual operation. This is attained in power mode through proper alignment of gears, proper support of the lead screw and flexibly coupling the gear train and lead screw. Acceptable sound levels are attained in manual mode by disengaging the gear train 137 and motor 152 for manual operation.

The swing door actuation system may be suitable for packaging and mounting to a typical vehicle swing door. The connecting bracket could be in the front (as shown in FIG. 1) of the actuator or in the rear depending on the packaging objectives. The motor 152 may be aligned in a parallel orientation with the housing rather than perpendicular to it.

It will be noted that the lead screw 128 and the nut tube 124 are just one example of an operative connection between the output end 136b of the clutch 136 and the extensible member 118. Any other suitable operative connection may be provided between the output end 136b of the clutch 136 to the extensible member 118 for converting the rotary motion of the output end 136b into extension and retraction of the extensible member 118. Furthermore, the lead screw 128 and nut tube 124 are just one example of a mechanism to convert rotary motion (i.e. the rotary motion associated with the output end 136*b* of the clutch 126) into substantially linear motion which drives the extension and retraction of the extensible member 118 from the housing 116. The actuator 100 need not include lead screw 128 and nut tube 124 to convert the rotary motion at the output end 136*b* of the clutch 136 into linear motion of the extensible member 118. Any other suitable mechanism for carrying out such a conversion may be used. For example, the output end 136*b* of the clutch 136 may connect to a pair of bevel gears to change the axis of the rotary motion by 90 degrees. The second bevel gear may co-rotate with a spur gear, which in turn drives a rack that is connected to the extensible member 118. As a result, the rotation at the output end 136*b* of the clutch 136 is converted into linear movement of the rack and the extensible member 118. While the lead screw 128 and nut tube 124, and the gears and rack described above generate pure linear motion of the extensible member (relative to the housing 116), it is possible to instead provide a mechanism that results in substantially linear motion, which may include motion along a relatively large diameter arc, for example. Such motion along a large diameter arc could drive an arcuate extensible member to move along an arcuate path during extension and retraction of the extensible member 118 from the housing 116. In such instances, the housing 116 itself may be slightly arcuate. Such motion of an extensible member 118 would still be effective in driving the opening and closing of the door 102.

The above-described embodiments are intended to be examples only, and alterations and modifications may be carried out to those embodiments by those of skill in the art.

The invention claimed is:

1. A method for controlling a swing door actuation system for moving a vehicular swing door relative to a vehicle body, wherein the actuation system includes an extensible member connected to the swing door or the vehicle body, a motor, a clutch operatively connected to the motor and the extensible member, comprising the steps of:
   engaging the clutch to couple the motor to the extensible member and move the extensible member in response to an indication that a user wishes to initiate a powered opening or powered closing of the swing door;
   disengaging the clutch to uncouple the motor from the extensible member in response to an indication that the user wishes to manually move the swing door;
   sending a signal from an actuated manual movement switch to a control system providing the indication that the user wishes to manually move the swing door, wherein the control system is configured to disengage the clutch in response to receipt of the signal from the actuated manual movement switch;
   sensing movement of the extensible member at a time when the motor is unpowered and sending a signal from a position sensor to the control system indicating that the user wishes to manually move the swing door in response to movement of the extensible member; and
   sending a manual movement signal to the control system in response to sensing that the motor is urged at a speed greater than a threshold design speed.

2. The method of claim 1, wherein the step of engaging the clutch is conducted without the application of electrical power to the clutch.

3. The method of claim 1, wherein the step of disengaging the clutch includes applying electrical power to the clutch.

4. The method of claim 1 including sending signals to a control system indicative of whether the user desires to initiate a powered opening or a powered closing of the swing door, wherein the control system is configured to engage the clutch to drive the motor to move the swing door in response to indication that the user wishes to initiate a powered opening or powered closing of the swing door.

5. The method of claim 4, wherein the signals are sent from a key fob, a dashboard mounted push button control, or manual activation of a door latch opening lever.

6. The method of claim 1 including actuating a door opening lever to actuate the manual movement switch.

7. The method of claim 1 including sending signals from a current sensor to the control system that are indicative of the amount of electrical current drawn by the motor.

8. A method for controlling a swing door actuation system for moving a vehicular swing door relative to a vehicle body, wherein the actuation system includes an extensible member connected to the swing door or the vehicle body, a motor, and a clutch operatively connected to the motor and the extensible member, comprising the steps of:
   operatively connecting the motor to the extensible member using the clutch without the application of electrical power to the clutch,
   operatively disconnecting the motor from the extensible member using the clutch with the application of electrical power to the clutch, and
   preventing movement of the extensible member and the swing door using the clutch when the swing door is exposed to an external torque that is less than a selected value and the motor is stopped.

9. The method of claim 8, wherein the actuation system includes an internally threaded member, a lead screw matable with the internally threaded member to permit relative rotation between lead screw and the internally threaded member, an wherein an ouput end of the clutch is connected to one of the lead screw and the internally threaded member, the other of the lead screw and the internally threaded member is connected to the extensible member and is slidable relative to the housing, and comprising the step of rotating the output end of the clutch to drive rotation of the one of the lead screw and the internally threaded member which in turn drives sliding movement of the other of the lead screw and the internally threaded member relative to the housing.

10. The method of claim 9, wherein the internally threaded member is slidable within the housing and is connected to the extensible member, the output end of the clutch is connected to the lead screw, and rotation of the output end of the lead screw drives rotation of the lead screw which in turn drives sliding movement of the internally threaded member.

11. The method of claim 8 including the steps of engaging the clutch and driving the motor to move the swing door in response to indication that a user wishes to initiate a powered opening or powered closing of the swing door, and disengaging the clutch in response to an indication that the user wishes to manually move the swing door.

12. The method of claim 8, wherein the actuation system includes a gear train coupled to the motor, and the gear train is not backdrivable.

13. The method of claim 12, wherein the gear train includes a worm coupled between the motor and a worm gear, the worm includes a thread having less than a selected lead angle, and the lead angle is selected to prevent backdriving of the worm.

14. The method of claim 8, wherein the actuation system includes a housing connectable to the other one of the swing door and the vehicle body, wherein the extensible member is extendible and retractable relative to the housing.

15. A method for controlling a swing door actuation system for moving a vehicular swing door relative to a vehicle body, wherein the actuation system includes an extensible member connected to the swing door or the vehicle body, a motor, and a clutch operatively connected to the motor and the extensible member, comprising the steps of:
- engaging the clutch to operatively connect the motor to the extensible member,
- disengaging the clutch to operatively disconnect the motor from the extensible member, the clutch has a selected slip torque value that prevents movement of the swing door when the swing door is exposed to an external torque that is less than the selected slip torque value and the motor is stopped;
- engaging the clutch and drive the motor to move the swing door in response to an indication that a user wishes to initiate a powered opening or powered closing of the swing door;
- disengaging the clutch in response to the indication that the user wishes to manually move the swing door;
- sending a signal from an actuated manual movement switch to a control system providing the indication that the user wishes to manually move the swing door, wherein the control system is configured to disengage the clutch in response to receipt of the signal from the actuated manual movement switch;
- sensing movement of the extensible member at a time when the motor is unpowered and sending a signal from a position sensor to the control system indicating that the user wishes to manually move the swing door in response to movement of the extensible member; and
- sending a manual movement signal to the control system in response to sensing that the motor is urged at a speed greater than a threshold design speed.

16. A method for controlling a swing door actuation system for moving a vehicular swing door relative to a vehicle body, wherein the actuation system includes an extensible member connected to the swing door or the vehicle body, a motor, and a clutch operatively connected to the motor and the extensible member, comprising the steps of:
- operatively connecting the clutch and the motor;
- operatively connecting the clutch and the extensible member;
- operatively connecting the motor to the extensible member by engaging the clutch;
- operatively disconnecting the motor from the extensible member by disengaging the clutch;
- preventing movement of the door using the clutch when the swing door is exposed to an external torque that is less than a selected value and the motor is stopped;
- driving the motor to move the swing door in response to indication that a user wishes to initiate a powered opening or powered closing of the swing door by engaging the clutch and disengaging the clutch in response to an indication that the user wishes to manually move the swing door; and
- providing manual movement signals in response to sensing that the motor is urged at a speed greater than a threshold design speed.

17. The method of claim 16 including sending signals to a control system indicative of whether the user desires to initiate a powered opening or a powered closing of the swing door, wherein the control system is configured to engage the clutch and drive the motor to move the swing door in response to the indication that the user wishes to initiate a powered opening or powered closing of the swing door.

18. The method of claim 17 wherein the signals are sent from a key fob, a dashboard mounted push button control, or manual activation of a door latch opening lever.

19. The method of claim 16 including sending signals from a current sensor to the control system that are indicative of the amount of electrical current drawn by the motor.

20. The method of claim 16 wherein the step of engaging the clutch is conducted without the application of electrical power to the clutch.

21. The method of claim 16 wherein the step of disengaging the clutch includes applying electrical power to the clutch.

22. The method of claim 16 including sending signals from an actuated manual movement switch to a control system indicative of whether the user desires to manually move the swing door, wherein the control system is configured to disengage the clutch in response to the indication that the user wishes to manually move the swing door.

23. The method of claim 22 including actuating a door opening lever to actuate the manual movement switch.

24. A method for controlling a swing door actuation system for moving a vehicular swing door relative to a vehicle body, wherein the actuation system includes an extensible member connected to the swing door or the vehicle body, a motor, a clutch operatively connected to the motor and the extensible member, comprising the steps of:
- engaging the clutch to couple the motor to the extensible member and move the extensible member in response to an indication that a user wishes to initiate a powered opening or powered closing of the swing door;
- disengaging the clutch to uncouple the motor from the extensible member in response to an indication that the user wishes to manually move the swing door;
- sending a signal from an actuated manual movement switch to a control system providing the indication that the user wishes to manually move the swing door, wherein the control system is configured to disengage the clutch in response to receipt of the signal from the actuated manual movement switch;
- sensing movement of the extensible member at a time when the motor is unpowered and sending a signal from a position sensor to the control system indicating that the user wishes to manually move the swing door in response to movement of the extensible member; and
- sending a manual movement signal to the control system in response to sensing that the motor is urged at a speed greater than a threshold design speed.

* * * * *